US008843125B2

United States Patent
Kwon et al.

(10) Patent No.: US 8,843,125 B2
(45) Date of Patent: Sep. 23, 2014

(54) SYSTEM AND METHOD FOR MANAGING MOBILE WALLET AND ITS RELATED CREDENTIALS

(75) Inventors: Yongsung Kwon, Seongnam-si (KR); Hyungjoon Hong, Seoul (KR); Jiwon Kang, Seoul (KR); Hyunjin Kim, Yongin-si (KR)

(73) Assignee: SK C&C, Seongnam, Gyeonggi-Do (KR)

( * ) Notice: Subject to any disclaimer, the term of this patent is extended or adjusted under 35 U.S.C. 154(b) by 446 days.

(21) Appl. No.: 13/310,091

(22) Filed: Dec. 2, 2011

(65) Prior Publication Data

US 2012/0172026 A1    Jul. 5, 2012

Related U.S. Application Data

(60) Provisional application No. 61/428,846, filed on Dec. 30, 2010, provisional application No. 61/428,851, filed on Dec. 30, 2010, provisional application No. 61/428,852, filed on Dec. 30, 2010, provisional application No. 61/428,853, filed on Dec. 30, 2010.

(51) Int. Cl.
| | |
|---|---|
| *H04W 4/00* | (2009.01) |
| *H04W 12/04* | (2009.01) |
| *H04L 29/06* | (2006.01) |
| *H04W 12/06* | (2009.01) |

(52) U.S. Cl.
CPC .............. *H04W 12/06* (2013.01); *H04W 12/04* (2013.01); *H04L 63/067* (2013.01)
USPC .......................................... 455/419; 455/410

(58) Field of Classification Search
USPC ......... 455/410, 418, 419, 558; 705/16, 39, 41
See application file for complete search history.

(56) References Cited

U.S. PATENT DOCUMENTS

| 5,221,838 | A | 6/1993 | Gutman et al. |
|---|---|---|---|
| 6,199,762 | B1 | 3/2001 | Hohle |
| 6,480,957 | B1 | 11/2002 | Liao et al. |
| 6,487,403 | B2 | 11/2002 | Carroll |
| 6,950,939 | B2 | 9/2005 | Tobin |
| 7,024,390 | B1 | 4/2006 | Mori et al. |
| 7,065,341 | B2 | 6/2006 | Kamiyama et al. |
| 7,146,159 | B1 | 12/2006 | Zhu |
| 7,149,545 | B2 | 12/2006 | Hurst et al. |
| 7,155,411 | B1 | 12/2006 | Blinn et al. |
| 7,197,297 | B2 | 3/2007 | Myles et al. |

(Continued)

OTHER PUBLICATIONS

GlobalPlatform, Card Specification, Version 2.2, published Mar. 2006.

*Primary Examiner* — Sam Bhattacharya
(74) *Attorney, Agent, or Firm* — Lowe Hauptman & Ham, LLP (57) ABSTRACT

A method for provisioning a contactless card applet in a mobile device with a mobile wallet application, including activating the mobile wallet application, connecting to a Trusted Service Manager (TSM) system, synchronizing the mobile wallet application with the TSM system, displaying a contactless card applet based on attributes of the mobile device, receiving a selection of a contactless card applet, retrieving a widget and a wallet management applet (WMA) corresponding to the contactless card applet, and provisioning the selected contactless card applet, the widget, and the WMA. A wallet management system (WMS) in a non-transitory storage medium to store and manage mobile wallet account information including a wallet client management component, a widget management component, a device profile management component, and a rule engine.

25 Claims, 5 Drawing Sheets (56) References Cited

U.S. PATENT DOCUMENTS

| | | |
|---|---|---|
| 7,233,785 B2 | 6/2007 | Yamagishi et al. |
| 7,233,926 B2 | 6/2007 | Durand et al. |
| 7,236,742 B2 | 6/2007 | Hall et al. |
| 7,286,818 B2 | 10/2007 | Rosenberg |
| 7,389,123 B2 | 6/2008 | Rydgren et al. |
| 7,415,721 B2 | 8/2008 | Fransdonk |
| 7,447,494 B2 | 11/2008 | Law et al. |
| 7,454,233 B2 | 11/2008 | Lu et al. |
| 7,469,151 B2 | 12/2008 | Khan et al. |
| 7,490,775 B2 | 2/2009 | Biderman |
| 7,527,208 B2 | 5/2009 | Hammad et al. |
| 7,628,322 B2 | 12/2009 | Holtmanns et al. |
| 7,689,205 B2 | 3/2010 | Toy et al. |
| 7,689,508 B2 | 3/2010 | Davis et al. |
| 7,707,113 B1 | 4/2010 | DiMartino et al. |
| 7,708,194 B2 | 5/2010 | Vawter |
| 7,711,392 B2 | 5/2010 | Brown et al. |
| 7,819,307 B2 | 10/2010 | Lyons et al. |
| 7,822,439 B2 | 10/2010 | Teicher |
| 7,822,688 B2 | 10/2010 | Labrou et al. |
| 2008/0010215 A1 | 1/2008 | Rackley III et al. |
| 2008/0040265 A1 | 2/2008 | Rackley III et al. |
| 2008/0208742 A1 | 8/2008 | Arthur et al. |
| 2009/0124234 A1 | 5/2009 | Fisher et al. |
| 2009/0307139 A1 | 12/2009 | Mardikar et al. |
| 2009/0307140 A1 | 12/2009 | Mardikar |
| 2010/0125495 A1 | 5/2010 | Smith et al. |
| 2010/0125508 A1 | 5/2010 | Smith |
| 2010/0138518 A1 | 6/2010 | Aiglstorfer et al. |
| 2010/0145835 A1 | 6/2010 | Davis et al. |
| 2010/0205432 A1 | 8/2010 | Corda et al. |
| 2010/0211507 A1 | 8/2010 | Aabye et al. |
| 2010/0275242 A1 | 10/2010 | Raffard et al. |
| 2010/0275269 A1 | 10/2010 | Vilmos et al. |
| 2010/0291904 A1 | 11/2010 | Musfeldt et al. |
| 2010/0306107 A1 | 12/2010 | Nahari |
| 2010/0330958 A1 | 12/2010 | Corda et al. |
| 2011/0078081 A1 | 3/2011 | Pirzadeh et al. |
| 2014/0089185 A1* | 3/2014 | Desai et al. .................. 705/41 |

* cited by examiner

Fig. 1

Fig. 2. Install Wallet Application

Fig. 3. Install Widget (prior SP reg)

Fig. 4. Dynamic Filtering

Fig. 5. Synchronization

SYSTEM AND METHOD FOR MANAGING MOBILE WALLET AND ITS RELATED CREDENTIALS

CROSS REFERENCE TO RELATED APPLICATION

This application claims priority from and the benefit under 35 U.S.C. §119(a) of U.S. Provisional Patent Application No. 61/428,846, filed on Dec. 30, 2010, which is incorporated by reference for all purposes as if fully set forth herein. Also, the present application is related to U.S. Provisional Patent Application No. 61/428,851 filed on Dec. 30, 2010; U.S. Provisional Patent Application No. 61/428,852, filed on December 30; and U.S. Provisional Patent Application No. 61/428,853, filed on December 30. Applicant hereby incorporates by reference the above-mentioned provisional applications, which are not admitted to be prior art with respect to the present invention by their mention here or in the background section that follows.

BACKGROUND OF THE INVENTION

1. Field

The following description relates to management of virtual cards stored on mobile devices.

2. Discussion of the Background

With the advent of advancing mobile technology, more features have been integrated into mobile devices. From GPS applications to mobile office products, mobile devices, such as mobile communicative terminals, have practically become a necessity for everyday needs. In order to further utilize mobile technology to better cater to a user's daily requirements, attempts have been made to provide for a mobile financial management system to replace conventional physical wallets. Specifically, this mobile wallet functionality was sought to be realized through provisioning of card issuer's account information directly into a secure element (SE) of the mobile device equipped with Near Field Communication (NFC) chipset. The SE may be a smart card chip capable of storing multiple applications, including of account specific information that may not be easily accessed by external parties. The model mobile wallet application may have the same composition as a conventional wallet, which may contain payment cards, member cards, transportation cards, and loyalty cards.

Further, to make the wallet function more convenient to the owners of the mobile device, a method of providing contactless payment (NFC-based applications) through provisioning account specific information within the secure domain of the mobile device's SE has been provided. More specifically, user financial credentials, such as credit card numbers, may be provisioned onto mobile devices equipped with Near Field Communication chipset (NFC enabled) to make payments. Once the user financial credentials have been provisioned onto the NFC enabled mobile device, the provisioned NFC enabled device may transfer information or make payments to another NFC compatible device by coming near within a few centimeters of one another without physically contacting each other. This type of technology is conventionally referred to as "contactless" technology and a payment made with this technology is referred to as "contactless" payment.

However, regardless of benefits that may be obtained through integrating wallet functionality into mobile device, prevailing technology still lacks an effective means to manage various payment applets residing within the mobile device.

With the advent of NFC-based contactless payment applications, users were provided a way to select a contactless payment applet (i.e., contactless payment virtual card) from various contactless payment applets stored in the mobile device for payment at corresponding point-of-sale (POS) devices. However, while these contactless payment applets may be selected to make a purchase, the management of payment applets may be limited. For example, a user may be limited to view the contactless payment applets stored in the user's mobile device when interacting with a POS device. Further, even if the user is able to view the various contactless payment applets stored in the mobile device with or without the POS device, the user may be unable to view the details related to the contactless payment applets (e.g., account number, expiration date, security code, balance and the like). Accordingly, users may be unable to effectively manage or keep track of various contactless payment applets stored in their respective mobile devices.

Typically, the contactless card applets may be stored within a specific compartment, or a secured domain, of the SE to be accessed during an interaction with the POS device. Moreover, even when such payment applications are accessed, since these applications are managed through industry standard Payment Procedure Secure Elements (PPSE) that only provide for application identification (ID) and label, a limited generic description may be provided to the user. Accordingly, the user may be unable to view any account specific information stored within the SE or manage such applications with or without the use of POS equipment.

Another limitation of current mobile wallet applications is the lack of support providing for such technology. With such focus on mobile commerce, many competing service providers seek delivering their services to the users. However, such services may be offered to the users without regard to the mobile device capabilities or mobile service providers utilized by the user. Due to technical or business compatibility, there may be numerous applications that may be inapplicable to the user's individual attributes (e.g., bank membership, mobile service provider, manufacturer of a mobile device owned by the user, type of secure element installed in the mobile device, operating system of the mobile device, and the like). Accordingly, users may often be bombarded with various applications that may be inapplicable to the user, making the process more difficult than necessary.

Another issue with the current mobile wallet application is its ability to update its information. As various service providers operate independently from one another, when an update is required by a particular service provider, each individual application is typically updated separately. Such inefficiency may dissuade users from obtaining crucial updates that may be necessary to a particular application.

SUMMARY

Exemplary embodiments of the present invention provide a mobile device to store a mobile wallet application and a wallet management system (WMS) to store corresponding wallet application information. Exemplary embodiments of the present invention provide a method for provisioning a wallet application, a contactless card applet, a wallet management applet (WMA), and a widget. Exemplary embodiments of the present invention provide a method for synchronizing a mobile wallet application with the WMS.

Additional features of the invention will be set forth in the description which follows, and in part will be apparent from the description, or may be learned by practice of the invention.

Exemplary embodiments of the present invention provide a method for installing a wallet application in a mobile device including requesting, by the mobile device, a mobile wallet application comprising a corresponding Over-the-Air (OTA) proxy; receiving mobile wallet application installation information; installing the mobile wallet application in the mobile device; capturing mobile device information by using the OTA proxy, the mobile device information comprising secure element (SE) information; and transmitting the mobile device information for registering the installed mobile wallet application.

Exemplary embodiments of the present invention provide a method for managing mobile wallet accounts installed on a mobile devices including receiving a request for a mobile wallet application from a mobile device; transmitting the mobile wallet application to the mobile device; receiving mobile device information, the mobile device information comprising SE information; and registering the mobile device and the corresponding mobile wallet application in a trusted service manager (TSM).

Exemplary embodiments of the present invention provide method for provisioning a contactless card applet in a mobile device comprising a mobile wallet application including activating the mobile wallet application; connecting to a TSM system; synchronizing the mobile wallet application with the TSM system; displaying a contactless card applet based on attributes of the mobile device; receiving a selection of a contactless card applet; retrieving a widget and a WMA corresponding to the contactless card applet; and provisioning the selected contactless card applet, widget, and the WMA.

Exemplary embodiments of the present invention provide a WMS in a non-transitory storage medium to store and manage mobile wallet account information including a wallet client management component to store and to manage a mobile wallet application; a widget management component to store and to manage widgets; a device profile management component to store mobile device information; and a rule engine to filter a widget based on the mobile device information.

Exemplary embodiments of the present invention provide a mobile device including a SE; a mobile wallet application to store a widget corresponding to a contactless card applet, wherein the contactless card applet is stored in the SE; a WMA corresponding to the contactless card applet, wherein WMA is stored in the SE; and an OTA proxy to provision the contactless card applet, a widget corresponding to the contactless card applet, and the WMA.

It is to be understood that both foregoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ). Throughout the drawings and the detailed description, unless otherwise described, the same drawing reference numerals are understood to refer to the same elements, features, and structures. The relative size and depiction of these elements may be exaggerated for clarity, illustration, and convenience.

Figure 1:
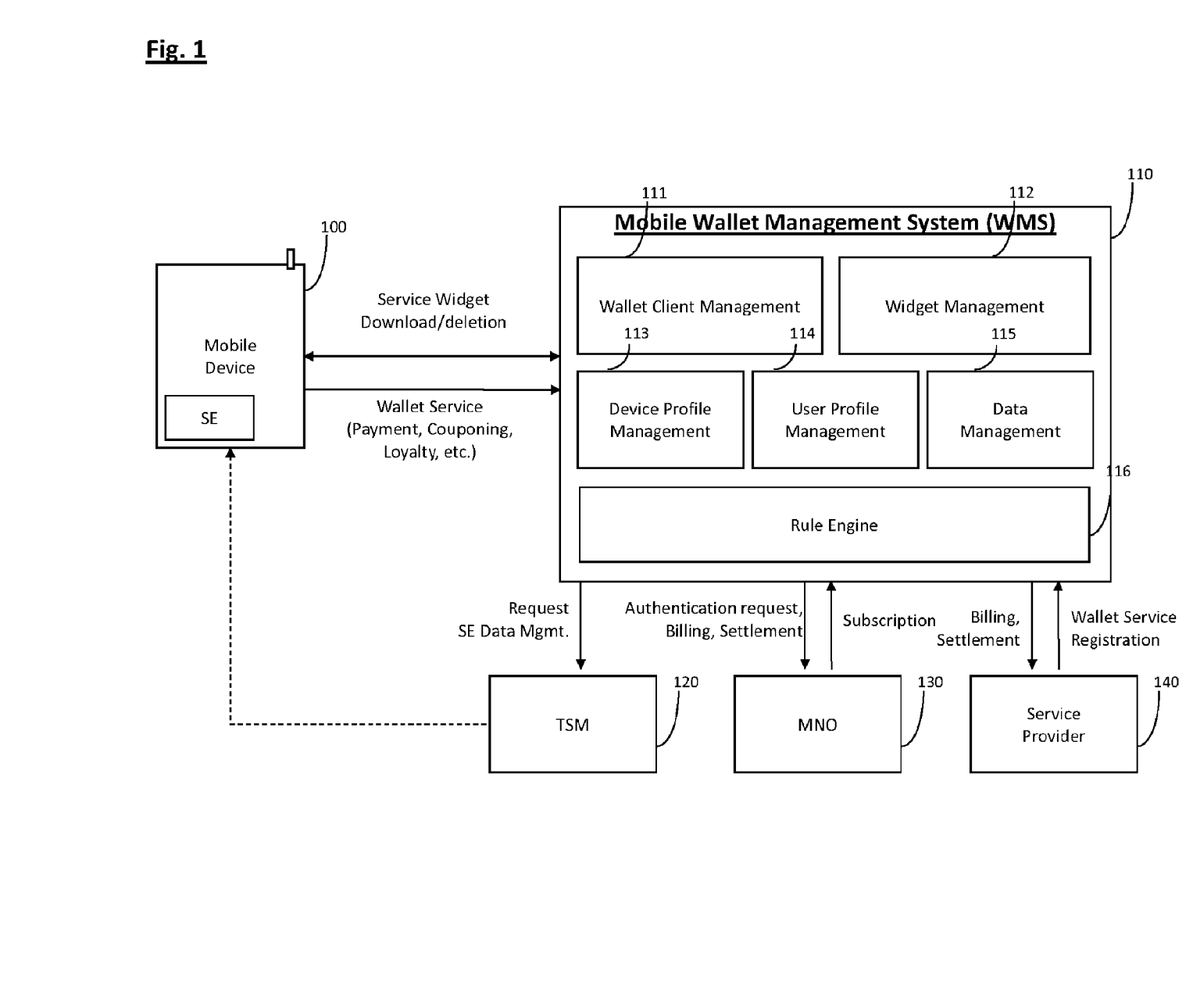
FIG. 1 is a system diagram of a mobile wallet application and associated integration in accordance with an exemplary embodiment of the present invention.

FIG. 1 is a system diagram of a mobile wallet system and associated integration, according to an exemplary embodiment of the present invention.

As shown in FIG. 1, an example system utilizing mobile wallet technology may include a mobile device 100, mobile wallet management system (WMS) 110, supporting Trusted Service Manager (TSM) system 120, Mobile Network Operator (MNO) 130, and Service Provider (SP) 140.

WMS 110 includes a wallet client management component 111, widget management component 112, device profile management component 113, user profile management component 114, data management component 115, and rule engine 116.

In particular, wallet client management component 111 is responsible for the wallet application itself (referred as the container), which may house the individual widgets (e.g., applications stored at the application level related to a financial institution, transportation account, and the like). The wallet client management component 111 may store container specific information, including the type of wallet application and manufacturer. For example, wallet client management component 111 may recognize a user John has a mobile wallet application manufactured by Google® and has specified set of known functionalities. By managing the type of wallet application the user has on the mobile device, it may be possible to provide the same wallet application when necessary.

Widget management component 112 on the other hand is responsible for the individual widgets stored within the wallet container. Widgets may be an application configured to interface with a user of the mobile device. In an example, widgets may refer to individual payment applications, transportation applications, and other related applications. Device Profile management component 113 houses a memory to store one or more programs, such as applications, and other related information. Device Profile management component 113 may store device specific information, such as information related to the mobile device itself including type of mobile device, supporting operating system (OS), mobile service provider, and other relevant information. User Profile management component 114 captures user identifying information such as name, address, birthday, phone number, and the like. Data Management component 115 allows further expansion of data management services offered by a mobile WMS (e.g., transaction history, user preferences, loyalty programs, digital receipts, digital coupons and the like). Rule engine 116 may filter widgets based on information related to the mobile device. Although various components were illustrated to be included in the WMS 110, the configuration of WMS 110 is not limited thereto. The illustrated components may be included within the WMS 110 or external to the WMS 110.

The disclosed WMS 110 may reside within TSM system 120 or independent of the TSM system 120. For the purposes of this disclosure, it will be assumed that the WMS 110 is housed within the TSM system 120. Like the TSM system 120, WMS 110 may interact with MNO 130 to transmit and receive billing related information. Further, WMS 110 may interact with SP 140 to receive and transmit SP payment card information.

The TSM system 120 may refer to a third party entity positioned to consolidate various information from various service providers including, financial institutions, MNOs, handset manufacturers, and card manufacturers. As TSM system 120 may hold various information from various parties, the mobile device may interact with the TSM system individually rather than various discrete entities. Accordingly, the described TSM system 120 may act as an integration point for all of the external parties the mobile device may deal with, providing for a seamless and more efficient operation of mobile services.

Figure 2:
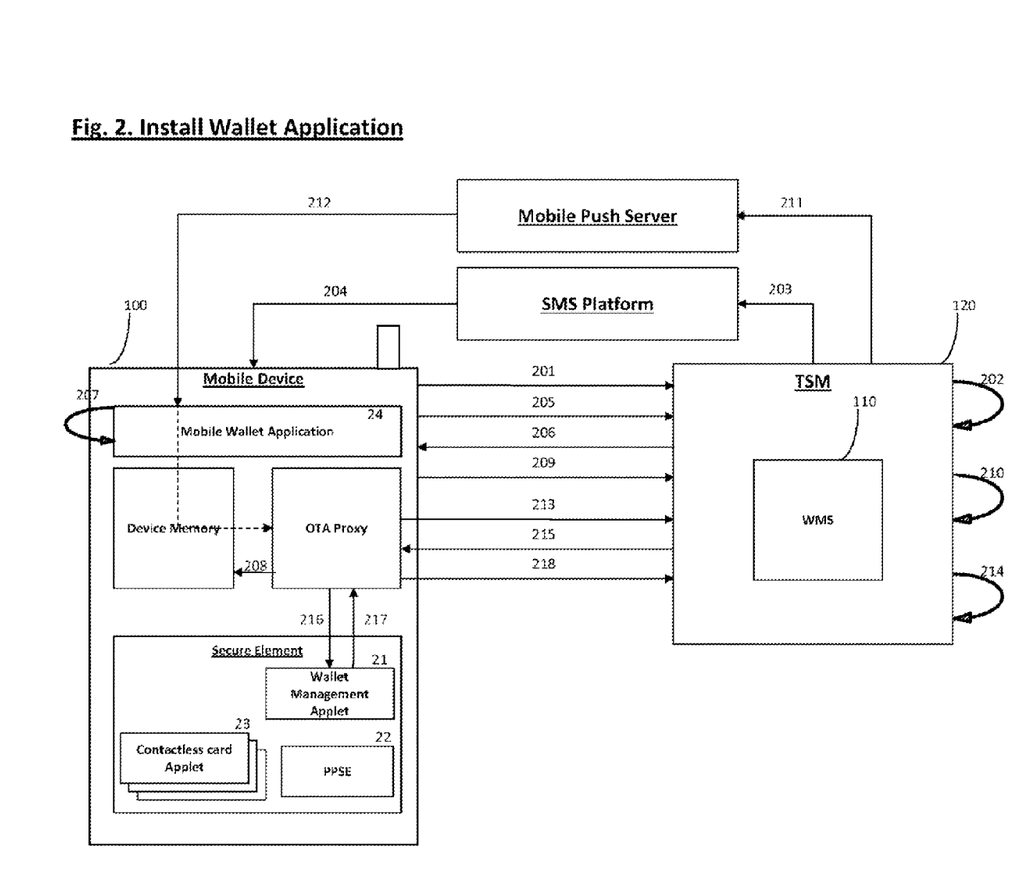
FIG. 2 is a system diagram illustrating a system and method for provisioning mobile card wallet management application along with supporting applications, mobile card widgets, contactless card applets, and related credentials in accordance with an exemplary embodiment of the present invention.

A method for installing a mobile wallet application and associated management applet in a secure element (SE) is described below in reference to FIG. 2. FIG. 2 is a system diagram illustrating a system and method for installing a mobile wallet application on the mobile device and correlating wallet management applet in the SE of the mobile device in accordance with an exemplary embodiment of the present invention.

As shown in FIG. 2, in step 201, the mobile device 100 requests a new mobile wallet application 24. In an alternative flow, a SP 140 may request installation of the mobile wallet application 24 from the TSM system 120. When requesting installation of mobile wallet application 24 from the TSM system 120, the TSM system 120 may wait for the mobile device 100 to connect to the TSM system 120 before installing the mobile wallet application 24. The TSM system 120 may install the mobile wallet application 24 directly upon connection to the mobile device 100 or wait until the user approves the request to install the mobile wallet application 24. If installation is executed, a corresponding widget representing a virtual card, such as a virtual credit card, may be provisioned to reside within the respective mobile wallet application 24. In an example, the widget representing the virtual card may reside within the mobile wallet application 24.

Once request is made, in step 202, the TSM system 120 receives the mobile wallet application installation request and corresponding identification information and checks for duplicate records existing in the TSM system 120. If it is determined that the requesting customer is a new customer, a new record is created within the TSM system 120. If the customer information already exists, TSM system 120 may verify the existing customer and update the customer's information, if applicable.

After a customer account has been created or updated, if it is determined that the mobile wallet application 24 is not installed on the mobile device 100, the TSM system 120 will confirm the mobile wallet application installation request and initiate the wallet application installation process. The installation process may be initiated by transmitting a Wireless Application Protocol (WAP) message with an embedded Uniform Resource Locator (URL) to the Short Message Service (SMS) platform in step 203, which relays the message to the mobile device 100 in step 204. However, the mobile wallet application 24 may be obtained in various other ways as well and is not limited to the WAP message method as described above. The mobile wallet application 24 may be downloaded directly to the requesting mobile device 100, sent to the user in a physical medium storing the application, or by other suitable methods for providing software applications.

The user, upon receipt of the installation message from the SMS platform, may initiate the actual installation process by sending a request to the TSM system 120 in step 205.

In response, TSM system 120 transmits the requested mobile wallet application 24 to mobile device 100 for installation and an accompanying over-the-air (OTA) proxy program to allow OTA provisioning in step 206. Although mobile wallet application 24 and OTA proxy are shown as being part of mobile device 100, an ordinarily skilled artisan understands that these elements may not be present on mobile device 100 until they are installed.

Once the mobile wallet application 24 and accompanying OTA proxy program have been downloaded, the mobile wallet application 24 may be launched by the requesting user in step 207. Alternatively, the mobile wallet application 24 may be launched automatically once it is downloaded. Also, in the event OTA proxy is already downloaded or installed, the mobile wallet application 24 may be downloaded independently of the OTA proxy. Although not illustrated, the accompanying OTA proxy may be included in the mobile wallet application 24.

In step 208, the OTA proxy captures the mobile device information (e.g. International Mobile Equipment Identity (IMEI)/Mobile Equipment Identifier (MEID), Mobile Subscriber Integrated Services Digital Network Number (MSISDN)), including SE information (e.g. Card Production Life Cycle (CPLC), Card Serial Number (CSN), Card Image Number (CIN), Integrated Circuit Card Identification (IC-CID)), which may be stored in a device memory component of the mobile device 100. The OTA proxy may be a separate component from the mobile wallet application 24, or may be included in the mobile wallet application 24.

Afterwards, in step 209, the OTA proxy sends the captured SE and mobile device information to the TSM system 120, which may house a WMS 110 (as shown in FIG. 2) or be in communication with an external WMS 110 (as shown in FIG. 1).

The WMS 110, upon receipt of the information provided by the OTA proxy, creates a Mobile identification (ID) for the installed mobile wallet application 24 in step 210. Once the mobile ID has been created, the WMS 110 requests TSM system 120 to provision a corresponding wallet management applet (WMA) 21 with the following information via OTA proxy: CPLC or CSN, CIN, Mobile ID and WMA personalization data. In an example, WMA 21 may include both a WMA 21 container and one or more WMA 21 applets. WMA 21 container may manage the information stored in the WMA 21 applets. WMA 21 container may be installed in the mobile device 100 when WMA 21 applet is requested to be installed, or when the mobile wallet application is installed, or separately without regard to either the WMA 21 applet or the mobile wallet application.

The WMA 21 container is a software application that may reside within the SE of the mobile device 100 to manage account information related to the contactless card applet 23 (i.e. WMA 21 applet) that may be typically inaccessible by the user. In an example, the SE may store one or more contactless card applets that may be used through a mobile device 100 with NFC capability, but the contactless card applets may largely be inaccessible by the user. More specifically, during a financial transaction, the NFC enabled mobile device may transmit contactless card information, which may include account specific information to a POS device to complete the transaction. However, even during this transaction, the user is typically limited to the selection of a generic logo corresponding to the contactless card applet being used in the transaction, but no account specific information may accessed by the user of the mobile device 100. In an example, account specific information may include credit card number, expiration date, security code (e.g., a combination of numbers typically found on back of credit cards), personal identification number (PIN) (e.g., a combination of numbers typically used to conduct financial transactions with the user's financial institution), and other related information.

To provide the user of the mobile device with the account specific information related to contactless card applets, separate account information associated with the corresponding contactless card applet 23 (e.g. credit card number, expiration date, security code, PIN, etc.) may be provisioned into the SE as WMA 21 applets. The respective account information or WMA 21 applet may be provided by duplicating the account information associated with the contactless card when the TSM system receives contactless card applets from SPs to provision into the mobile device 100. Alternatively, SP providing the contactless card applet may provide the account related information separately to the TSM system for provisioning.

In step 211, TSM system 120 sends a wake up message to the mobile push server (e.g. Cloud to Device Messaging (C2DM)) with a mobile device identifier to wake up OTA proxy residing in the requesting mobile device 100.

The mobile push server routes the received message to the mobile wallet application 24, which in turn sends the request to OTA proxy and wakes OTA proxy in step 212.

In step 213, the OTA proxy gathers mobile device and SE specific information such as MSISDN and CIN and sends it over to TSM system 120. In an example, OTA proxy gathers mobile device and SE specific information to send to TSM system 120 every time it is woken up. Alternatively, this step may be skipped and the mobile device and SE information provided in step 209 to register the mobile device 100 and the wallet application may be used.

Once TSM system 120 receives the information sent by OTA Proxy in step 213, TSM system 120 processes the information and converts the identifying information along with the request to provision WMA 21 container into Application Protocol Data Unit (APDU) commands in step 214 and sends them over to OTA proxy in step 215.

Next, in step 216, OTA proxy receives the APDU commands to install WMA 21 container and relays them to the SE, which processes the APDU commands to install the requested WMA 21 container and its associated credentials. SE then responds back with the result of each command request in step 217. Although WMA 21 container, PPSE 22, and Contactless Card Applet 23 are shown as being part of mobile device 100, an ordinarily skilled artisan understands that these elements may not be present on the SE of the mobile device 100 until they are installed.

Subsequently, OTA Proxy relays the result back to the TSM system 120 in step 218, and the TSM system 120 updates its system with the result.

Once the mobile wallet application 24 has been successfully installed in the mobile device 100, the user may provision SP 140 specific contactless card applets 23, and its corresponding widget applications and WMA 21 applet onto mobile device 100.

Figure 3:
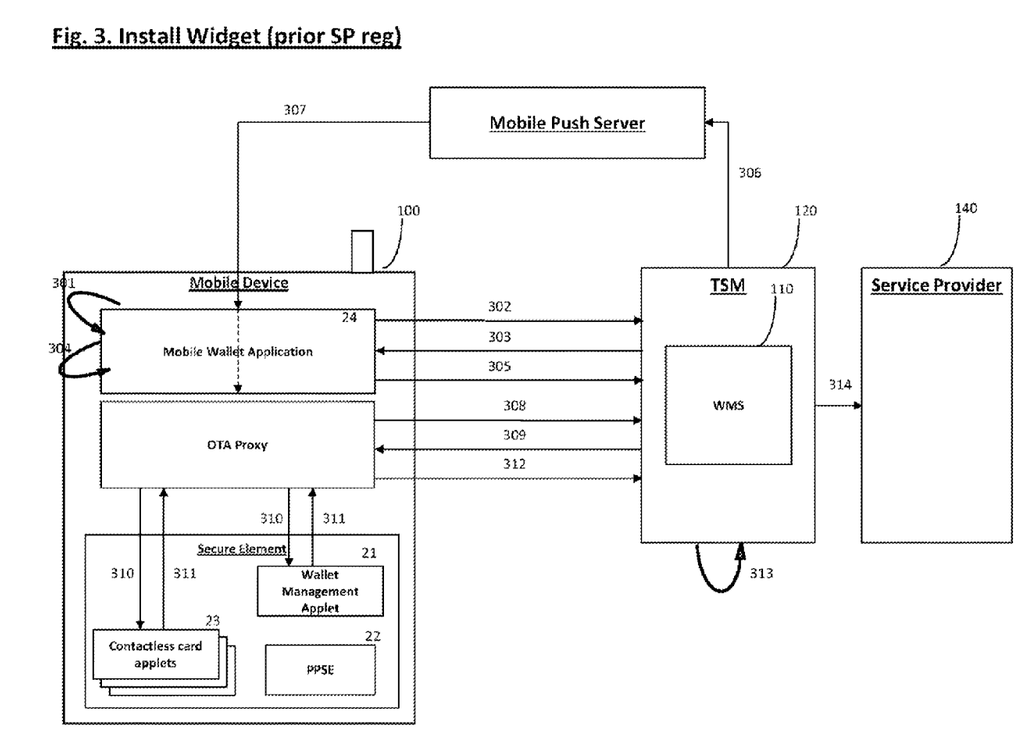
FIG. 3 is a system diagram illustrating a system and method for provisioning service provider specific mobile card widgets, contactless card applets, and wallet management application account information in accordance with an exemplary embodiment of the present invention.

FIG. 3 is a system diagram illustrating a method for installing a mobile widget into the mobile wallet application 24 and its corresponding contactless card applet and account information into the SE of the requesting mobile device in accordance with an exemplary embodiment of the present invention.

In step 301, the user logs into the mobile wallet application 24 to start the mobile wallet application 24 for use. Once started, the mobile wallet application 24 connects to the TSM system 120, which may house WMS 110, for synchronization in step 302. A more detailed description of how this synchronization process operates is provided below with reference to FIG. 5.

TSM system 120 checks for any updated information made by external parties (e.g. SP 140, user by web access, TSM system 120 administrator, and/or etc.) and sends the list of waiting updates to the mobile wallet application 24 in step 303. Further, additional applications that user may be interested in may be displayed for download through dynamic filtering. The applicable applications based on user attributes will be displayed through this filtering process. A more detailed description of how this dynamic filtering works is provided below with reference to FIG. 4.

The mobile device user is prompted to decide whether to update the mobile wallet application 24 with the changes made at the TSM system 120, if any, in step 304. Alternatively, the mobile device may update the mobile wallet application 24 automatically with the respective changes in step 304.

When the mobile device 100 updates the mobile wallet application 24 or downloads a new application, a request is made to the TSM system 120/WMS 110 to provision the updates and/or selected card applications in step 305. If a request to update requires updating of account specific information, such as change in account number or expiration date, the process to update the application will follow the same steps regardless of the information being updated.

Further, if a request to provision the selected contactless card applet 23 is made, such as a "VISA®" contactless card applet, a corresponding widget and WMA 21 applet may be programmed to be provisioned automatically. The corresponding widget may reside in the mobile wallet application 24, at the application level, to provide an interface to the user. The corresponding WMA 21 applet, which may include account specific information of the contactless card apple (e.g. credit card number, expiration date, security code, PIN, etc.), may be provisioned into the SE. By installing both the WMA 21 applet and the widget, the user may view and manage the information stored in the WMA 21 applet through the corresponding widget.

TSM system 120 processes the provisioning request and sends a wake up message request to the mobile push server in step 306, and the push server proceeds to relay the request the mobile wallet application 24, which in turn sends the message to OTA proxy, thereby waking OTA proxy in step 307.

In step 308, OTA proxy wakes up and gathers mobile device and SE specific information, such as MSISDN and CIN, and sends the collected information to TSM system 120.

Once TSM system 120 receives the information sent by OTA Proxy, TSM system 120 processes the received information along with the provisioning command and converts both the received information along with the provisioning command into APDU commands to send to OTA proxy in step 309. When sending the APDU commands, the contactless card applet and the corresponding WMA 21 applet are sent to OTA proxy for provisioning into the SE. However, since the widget is provisioned at the application level and not into the SE, the widget may be provisioned through the OTA proxy or through a wireless network.

Next, in step 310, OTA proxy receives the APDU commands from the TSM system 120 to install requested issuer contactless applets 23 and correlating WMA 21 applet to be provisioned. In an example, contactless applets 23 and correlating WMA 21 applet are provided in different domains of the same SE. In response, SE processes the APDU commands for both the contactless applet and the WMA 21 applet and sends back the result of each command request in step 311. As APDU commands may be processed one at a time, multiple communications may be passed back and forth between the OTA proxy and the SE.

Subsequently, OTA Proxy relays the result back to the TSM system 120 in step 312, and the TSM system 120 updates its system with the result of the request in step 313. Once information is updated, notification of the results is sent to SP 140 in step 314. Similarly, the mobile wallet application 24 notifies TSM system 120 of the result of the widget installation. For example, the mobile wallet application 24 will notify the TSM system 120 whether the widget installation was a success or a failure.

Once account specific information is installed into WMA 21 container as WMA 21 applet, the respective mobile device 100 may access the information periodically for required updates. For example, the mobile device 100 may access the information stored in the WMA 21 applet using the mobile wallet application 24 to check for the expiration dates of the contactless card applets 23 stored within the mobile device 100 and prompt user for updates as necessary. Alternatively, the mobile wallet application 24 may check for updates automatically. In addition, the user may also gain access to the account number, security code, and corresponding expiration date as necessary to make purchases online for further utility. In an example, the information stored in the WMA 21 applet may allow the mobile device 100 to check the expiration date of the contactless card applet 23 and request update when the card applet expires.

WMA 21 container may, however, limit amount of change requests to the WMA 21 applet as they contain account specific information. For example, the number of times expiration date may be changed with a reference time period may be limited, or changes to the credit card numbers may be prohibited. In addition, WMA 21 container may prevent user from making changes directly in the WMA 21 applet but allow request for modification to the TSM system 120, which in turn will make the request to the relevant external parties. While the described process illustrates a preferred embodiment of the present invention, the amount of modification allowed by the WMA 21 container is not limited to what has been described. In some instances, WMA 21 container may allow direct modification to the account specific information as dictated by business needs.

Figure 4:
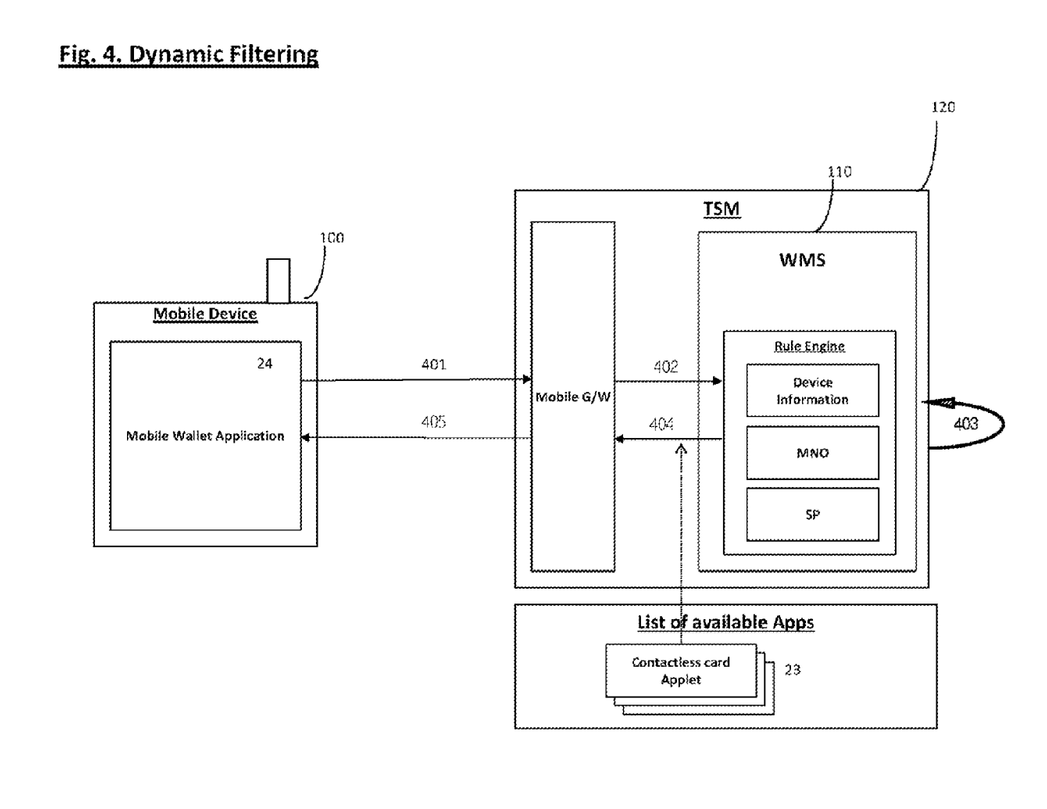
FIG. 4 is a system diagram illustrating a system and method for dynamically filtering applicable mobile wallet service provider specific widgets based upon user account attributes in accordance with an exemplary embodiment of the present invention.

FIG. 4 is a system diagram illustrating a method for dynamically filtering a list of mobile widget applications that are available for installation based upon corresponding mobile device attributes in accordance with an exemplary embodiment of the present invention.

In step 401, the user logs into the mobile wallet application 24, which seeks to connect with the TSM system 120/WMS 110.

The TSM system 120 receives the connection request through a mobile gateway residing within the TSM system 120 and relays the request to a Rule Engine in TSM system 120 in step 402. The TSM system 120 queries the user account in its system in step 403 for equipment information, MNO, SP accounts, and any other relevant information. Based on the mobile device 100 attributes, a filtered list of downloadable applications from the TSM system 120 may be displayed to the mobile device. In an example, mobile device 100 attributes may include, without limitation, the mobile network provider of the mobile device 100 (e.g. "Sprint®," "Verizon®", "AT&T®", etc.), financial institutions associated with the contactless card applets stored (e.g. "Wachovia®," "Bank of America®," "Chase®", etc.), mobile device 100 manufacturer (e.g. "HTC®", "Motorola®", "Apple®", etc.), and mobile device 100 hardware specifications (i.e. hardware, software, operating system, etc.).

Here, TSM system 120 may house a large list of available applications, including contactless card applets 23, as illustrated in FIG. 4. TSM system 120 may house various applications without regard to the device capabilities, SPs' relationship with other SPs, or other limitations that may be inherent in the business or technical environments. However, as an individual user connects with the TSM system 120 to download new applications, TSM system 120 may dynamically filter the list of available applications based upon the mobile device attributes described above.

As many mobile devices operate with various operating systems and standards, not all of the applets provided by the SP may be compatible with the user mobile device or user's MNO. Because of lack of standardization of hardware and software on mobile devices, an efficient method to filter only the relevant applets is helpful. Along with these technical limitations, many MNOs and SPs may decide not to provide their services to each other for business reasons. As the general public may not be familiar with such knowledge, an additional filtering mechanism may be provided to provide only the applicable applets to the requesting user. In an example, all of the provided limitations may be managed and applied by the Rule Engine in the TSM system 120. The Rule Engine may be housed in the TSM system 120 or may exist as an external entity, which interacts with TSM system 120 through a network. Further, the Rule Engine may be a combination of software and hardware, software to apply and manage the rules and hardware to store the relevant rules. Accordingly, by providing an active dynamic filtering mechanism at the TSM system 120 level, all of the parties involved in such transaction need to make only a general request to the TSM system 120 to access and to provide customer specific services.

Once the list of applicable applets have been dynamically filtered, TSM system 120 sends the list of applets to display to the mobile gateway in step 404, which relays it back to the mobile wallet application 24 in step 405.

Figure 5:
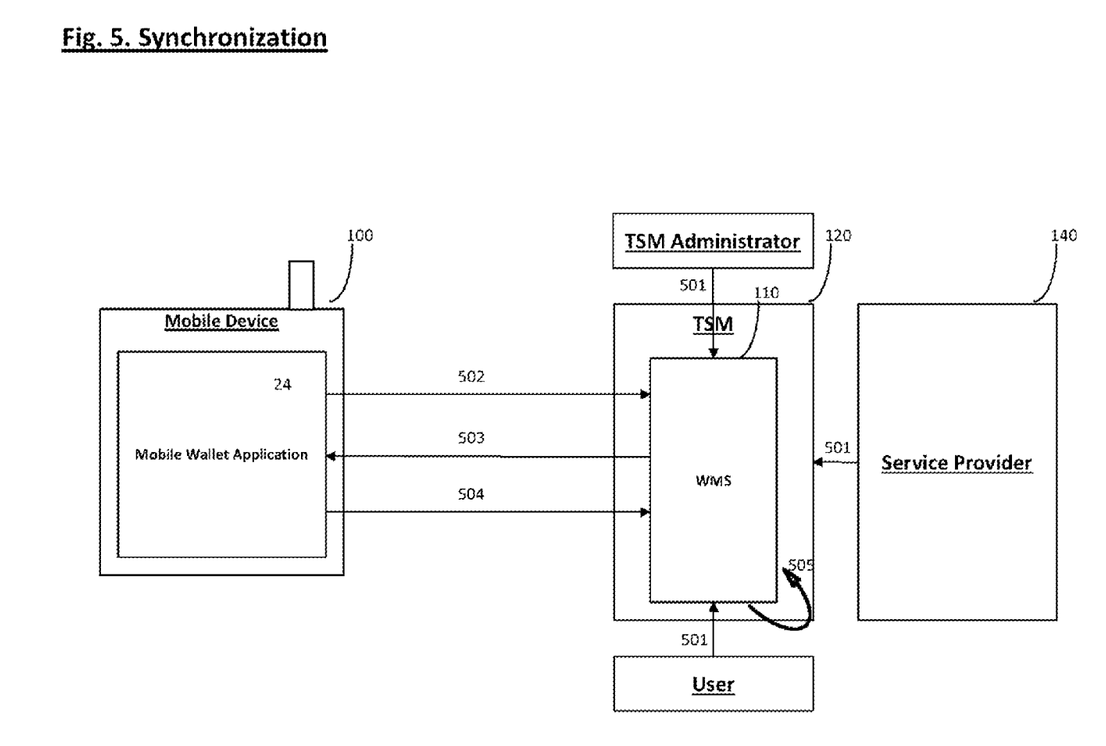
FIG. 5 is a system diagram illustrating a system and method for synchronizing mobile wallet application with the master mobile wallet configuration server to provide a most current version of the mobile wallet application in accordance with an exemplary embodiment of the present invention.

In FIG. 5, a system diagram is provided for synchronizing the mobile wallet application residing within the mobile device with the TSM system in accordance with an exemplary embodiment of the present invention. As with many electronic devices that may be prone to damage and wear, or often misplaced, a centralized management or storage may be beneficial to maintain a master file of the user wallet configuration.

In step 501, multiple external parties, such as credit card service providers as illustrated in FIG. 5, may send a request for changes to be made to the user's mobile wallet configuration directly to the TSM system 120/WMS 110, which may store the master configuration of the respective mobile wallet application 24. In addition, TSM system 120 administrators and the user themselves may access the TSM system 120 via web access or any other remote access functionality. As the mobile wallet application 24 may not always be on, a central repository allows external parties to make the necessary requests without regard to user's mobile wallet application 24's operating status. For example, SPs 140 may request an additional contactless card applet 23 to be provisioned to the user's SE on their own time without regard to the mobile wallet application 24's operating status. Similarly, TSM system 120 itself may recognize that the expiration date of the respective application is coming up and prompt the user to update the card for provisioning when the mobile wallet application 24 connects to the system.

While only TSM system 120 administrator, SP 140, and the user were displayed, the requesting party may be any external party to the TSM system 120.

Subsequently, in step 502, when the user logs into the mobile wallet application 24, the mobile wallet application 24 checks with the TSM system 120/WMS 110 for any modifications to the wallet configuration since the last login by the user. As the mobile wallet application 24 synchronizes every time the application is logged into, the user can be sure that the user has access to the most current information during use. In addition, by limiting synchronization events to access of mobile wallet application 24, secure access to sensitive information is provided only when the user is utilizing the mobile wallet application 24. However, if desired, mobile wallet application 24 may always be in sync by automatically whenever mobile device is on and has mobile signal.

Any updates made in the WMS 110 while mobile wallet application 24 was offline will be prompted for the user to make the updates in step 503. User may update one application at a time or all at once if such is desired. Also, the user may set the application to automatically update every change made in the TSM system 120/WMS 110 at synchronization.

In step 504, while mobile wallet application 24 is still active, any modifications that are made in the mobile wallet application 24 itself will be updated in the WMS 110 in step 505 as synchronization is a continuous one during usage. For example, if the user changes a user preference on the mobile wallet application 24, changes to the user preference may be updated into the WMS 110 in real time. Similarly, if the mobile device 110 prompts the user to update the expiration date of the contactless applet and the user agrees, user's request will be submitted to TSM system 120, which will process the request and route it to SP 140 for processing.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for installing a wallet application in a mobile device, comprising:
   requesting, by the mobile device, a mobile wallet application comprising a corresponding Over-the-Air (OTA) proxy;
   receiving mobile wallet application installation information;
   installing the mobile wallet application in the mobile device;
   capturing mobile device information by using the OTA proxy, the mobile device information comprising secure element (SE) information; and
   transmitting the mobile device information for registering the installed mobile wallet application.

2. The method of claim 1, wherein installing the mobile wallet application in the mobile device comprises automatically installing upon receipt of the mobile wallet application installation information.

3. The method of claim 1, further comprising provisioning a wallet management applet (WMA) container into the SE of the mobile device.

4. The method of claim 1, wherein receiving mobile wallet application installation information comprises:
   receiving a Wireless Application Protocol (WAP) message with an embedded Uniform Resource Locator (URL) from a Short Message Service (SMS) platform.

5. The method of claim 1, wherein capturing mobile device information comprises:
   capturing at least one of an International Mobile Equipment Identity (IMEI), a Mobile Equipment Identifier (MEID), a Mobile Subscriber Integrated Services Digital Network Number (MSISDN), a Card Production Life Cycle (CPLC), a Card Serial Number (CSN), a Card Image Number (CIN), and an Integrated Circuit Card Identification (ICCID).

6. The method of claim 3, wherein provisioning a WMA container into the SE comprises:
   transmitting a request to provision the WMA container; and
   receiving the WMA container installation information in Application Protocol Data Unit (APDU) commands; and
   provisioning the converted APDU commands to the SE.

7. A method for managing mobile wallet accounts installed on mobile devices, comprising:
   receiving a request for a mobile wallet application from a mobile device;
   transmitting the mobile wallet application to the mobile device;
   receiving mobile device information, the mobile device information comprising secure element (SE) information; and
   registering the mobile device and the corresponding mobile wallet application in a trusted service manager (TSM).

8. The method of claim 7, wherein registering the mobile device and the corresponding mobile wallet application in a TSM comprises:
   checking for registered account information corresponding to the requesting mobile device in the TSM system; and
   registering the mobile device in the TSM system in response to no corresponding registered account information being found in the TSM system, or updating account information in response to finding the corresponding registered account information in the TSM system.

9. The method of claim 7, further comprising transmitting an accompanying over-the-air (OTA) proxy application to the mobile device.

10. The method of claim 8, wherein registering the mobile device comprises:
creating a mobile identifier for the installed mobile wallet application;
storing the mobile device information; and
connecting the mobile device information with the mobile identifier.

11. A method for provisioning a contactless card applet in a mobile device comprising a mobile wallet application, the method comprising:
activating the mobile wallet application;
connecting to a Trusted Service Manager (TSM) system;
synchronizing the mobile wallet application with the TSM system;
displaying a contactless card applet based on attributes of the mobile device;
receiving a selection of a contactless card applet;
retrieving a widget and a wallet management applet (WMA) corresponding to the contactless card applet; and
provisioning the selected contactless card applet, the widget, and the WMA.

12. The method of claim 11, wherein synchronizing the mobile wallet application with the TSM system comprises:
receiving a change made to a mobile wallet application user account on the TSM system; and
provisioning the changed information.

13. The method of claim 11, wherein synchronizing the mobile wallet application with the TSM system comprises:
checking for a change made to a configuration of the mobile wallet application; and
transmitting the change to the TSM system.

14. The method of claim 11, wherein displaying a contactless card applet based on attributes of the mobile device comprises:
retrieving mobile device information comprising SE information;
transmitting the mobile device information; and
receiving filtered contactless card applet for provisioning, wherein the contactless card applet is filtered based on the mobile device information.

15. The method of claim 14, wherein displaying the contactless card applet further comprises:
receiving filtered contactless card applet for provisioning, wherein the contactless card applet is filtered based on the business rules.

16. The method of claim 11, wherein provisioning the selected contactless card applet, WMA and widget comprises:
transmitting a request for installation of the contactless applet and the corresponding widget and WMA to be installed, wherein the WMA is a software application configured to store account specific information and the widget is an application configured to interface with a user of the mobile device; and receiving the contactless applet, the WMA, and the widget information through OTA proxy.

17. The method of claim 16, wherein account specific information comprises at least one of a payment card number, a security code, an expiration date, and a personal identification number (PIN).

18. A wallet management system (WMS) in a non-transitory storage medium to store and manage mobile wallet account information, comprising:
a wallet client management component configured to store and to manage a mobile wallet application;
a widget management component configured to store and to manage widgets;
a device profile management component configured to store mobile device information; and
a rule engine configured to filter a widget based on the mobile device information,
wherein said wallet management system is configured to receive the mobile device information from a mobile device and store the mobile device information in the device profile management component, and
wherein said wallet management system is configured to register the mobile device and the mobile wallet application in a Trusted Service Manager (TSM) system.

19. The WMS of claim 18, wherein the wallet client management component further stores wallet application specific information comprising at least wallet application type and wallet application manufacturer information.

20. The WMS of claim 18, wherein the mobile device information comprises at least one of a mobile device type, a supporting Operating System (OS), a mobile service provider, a mobile device manufacturer, and a secure element (SE) type.

21. The WMS of claim 18, further comprising a user profile management component to capture and manage user identifying information.

22. The WMS of claim 18, wherein the WMS is hosted on the TSM system.

23. A mobile device, comprising:
a secure element (SE);
a mobile wallet application configured to store a widget corresponding to a contactless card applet, wherein the contactless card applet is stored in the SE;
a wallet management applet (WMA) corresponding to the contactless card applet, wherein the WMA is stored in the SE; and
an over-the-air (OTA) proxy configured to provision the contactless card applet, a widget corresponding to the contactless card applet, and the WMA,
wherein said OTA proxy is configured to capture mobile device information comprising SE information; and
wherein said OTA proxy is configured to transmit the mobile device information for registering the mobile wallet application.

24. The mobile device of claim 23, wherein WMA is configured to store account information associated with the contactless card applet, and the widget is configured to include a user interface.

25. The mobile device of claim 24, wherein the account information comprises at least one of a card number to access financial information, a security code, a personal identification number (PIN), and an expiration date.

* * * * *